US006987075B2

(12) United States Patent
Orlandi

(10) Patent No.: US 6,987,075 B2

(45) Date of Patent: Jan. 17, 2006

(54) MATTRESS COVER FABRIC WITH BARRIER EFFECT

(75) Inventor: Vittorio Orlandi, Arsago Seprio (IT)

(73) Assignee: Orlandi S.p.A., Milan (IT)

( * ) Notice: Subject to any disclaimer, the term of this patent is extended or adjusted under 35 U.S.C. 154(b) by 326 days.

(21) Appl. No.: 10/307,172

(22) Filed: Nov. 29, 2002

(65) Prior Publication Data

US 2003/0159213 A1 Aug. 28, 2003

(30) Foreign Application Priority Data

Nov. 19, 2002 (IT) .......................... MI2001A2521

(51) Int. Cl.
*B32B 31/00* (2006.01)

(52) U.S. Cl. .......................... 442/408; 28/104; 28/105; 156/148; 442/381; 442/384; 442/385; 442/387; 442/389

(58) Field of Classification Search .................. 28/104, 28/105; 156/148; 442/381, 384, 385, 387, 442/389, 408

See application file for complete search history.

(56) References Cited

U.S. PATENT DOCUMENTS 3,772,131 A * 11/1973 Triplett ........................ 428/90
4,526,830 A * 7/1985 Ferziger et al. ............. 442/139
4,808,467 A * 2/1989 Suskind et al. ............... 28/104
5,578,368 A * 11/1996 Forsten et al. ............. 442/407
6,306,234 B1 10/2001 Barker et al.
6,723,428 B1 * 4/2004 Foss et al. .................. 428/370

FOREIGN PATENT DOCUMENTS

JP 07-276595 A * 10/1995
JP 10-33342 A * 2/1998
WO WO 94/04739 3/1994
WO WO 01/49914 A1 7/2001

OTHER PUBLICATIONS

WP XP-002206486, Jul. 27, 1999, Unitaka LTD.
WP XP-002206487, May 8, 2001, Toray Ind Inc.
WP XP-002206488, Sep. 1, 1999, Xinlong Non-Woven Ind Co.

* cited by examiner

*Primary Examiner*—Jeff H. Aftergut

(57) ABSTRACT

The present invention describes a new mattress cover sheet with barrier effect against bacteria and parasites, consisting of a spunlace fiber based fabric. The spunlace fabric mattress cover can be produced in a structure with one or more layers, and can contain antibacterial substances. The sheet subject of the invention provides an effective barrier between the person and the mattress, in particular avoiding the transfer of pollutants from the mattress to the person and at the same time protecting the hygiene of the mattress itself.

13 Claims, 3 Drawing Sheets

2a

2b

MATTRESS COVER FABRIC WITH BARRIER EFFECT

FIELD OF THE INVENTION

The present invention describes a new mattress cover sheet with high bacteriological isolation power and ideal biocompatibility characteristics.

PRIOR ART

The mattress cover sheets have the function of isolating the mattress from the human body. Close contact between the human body and the mattress is in fact generally not advisable: the mattress is normally an excellent breeding ground for bacteria and mites due to the microclimate created during use (temperature, humidity, prolonged time). The mattress contains dusty material (deriving from the natural wool or erosion of the foam rubber) which can pass through the surface of the mattress and irritate the skin. Furthermore, as time passes, the surface layers of the mattress are subject to deterioration/contamination with bacteria and parasites; the deteriorated/contaminated surface can in its turn cause phenomena of skin irritation/allergy; in particular the passage of bacteria and parasites from the mattress towards the person should be avoided.

The role of the mattress cover is therefore that of providing a barrier between the mattress and the person, limiting deterioration of the mattress and above all preventing the passage of irritating substances, bacteria or parasites from the mattress to the person; at the same time, however, the sheet must allow the skin to breathe otherwise the above irritation phenomena can re-occur.

The mattress covers produced so far only partly satisfy the above requirements: for example, the barrier effect is obtained by considerably increasing the thickness of the sheet or adding plastic materials, and this considerably limits breathability. In some cases fabrics impregnated with antibacterial materials have been used but in this case the antibacterial product can be easily released, creating problems of skin toxicity and loss of the barrier effect of the sheet.

There is therefore a need for mattress cover sheets free from the above limitations which are able, in particular, to provide an effective barrier and at the same time are biocompatible and comfortable for the user.

SUMMARY OF THE INVENTION

The present invention describes a new mattress cover sheet with barrier effect against bacteria and parasites, comprising a spunlace fibre based fabric. The spunlace fabric mattress cover can be produced in a structure with one or more layers and can contain antibacterial substances. The sheet subject of the invention provides an effective barrier between the person and the mattress, in particular avoiding the transfer of pollutants from the mattress to the person and at the same time protecting the hygiene of the mattress itself.

DETAILED DESCRIPTION OF THE INVENTION

Figure 1:
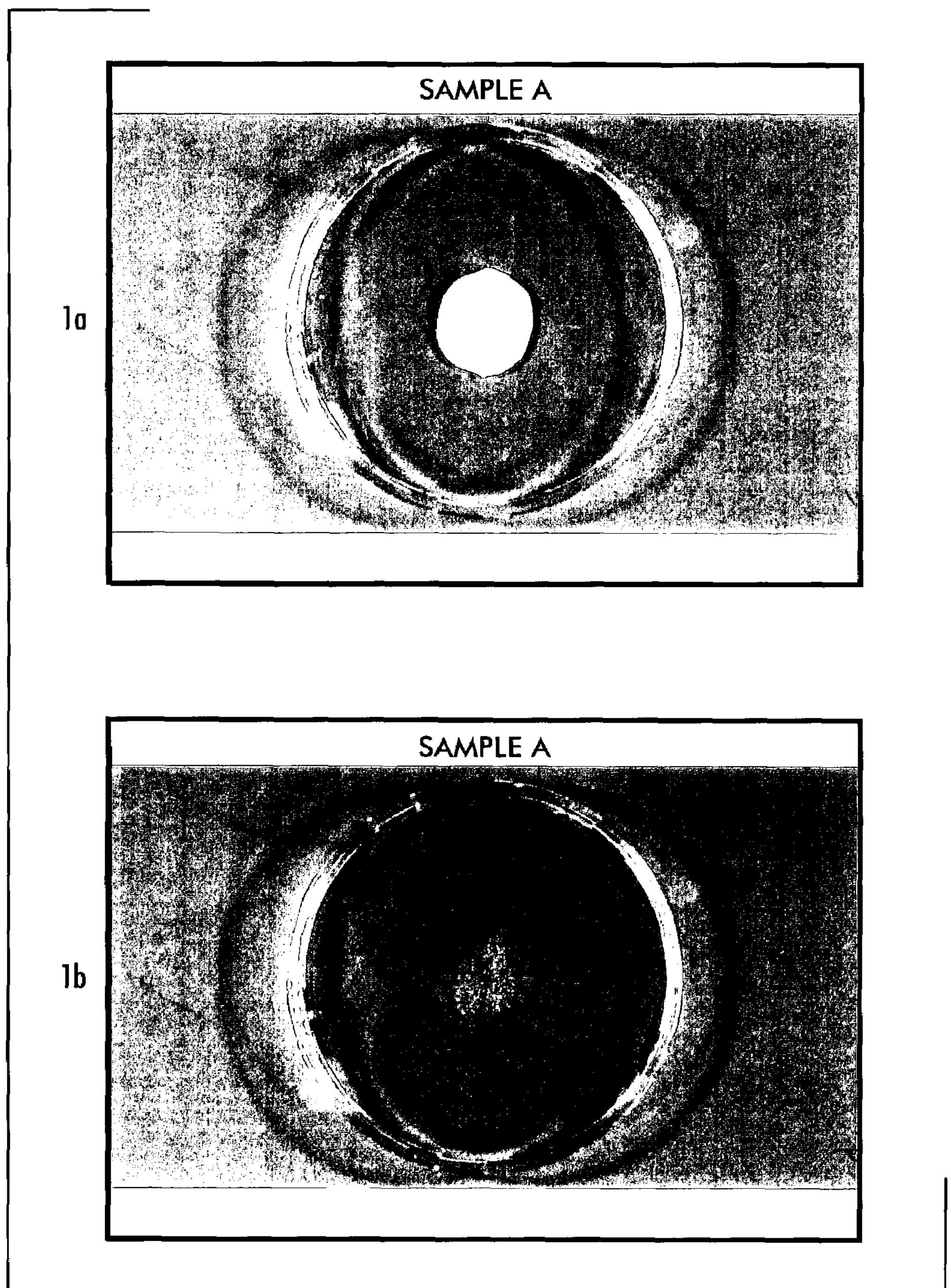
FIGS. 1–3: Assessment of the antibacterial barrier of the mattress cover sheet against *Staphylococcus aureus* ATCC 6538.

The present invention concerns a mattress cover sheet comprising a spunlace fibre based fabric.

Spunlace fabrics are non-woven fabrics, the fibres of which are mechanically interconnected; the interconnection is obtained by entangling the fibres by means of fine jets of water.

Spunlace fibres are formed, in particular, as follows: the fibres to be processed are mixed in the required proportions with the addition of additives if necessary to improve workability; the fibres are then carded, i.e. rendered uniform in a web which is calendered if necessary; the web is then entangled as above to give it the physical and mechanical characteristics of a non-woven fabric: in this phase the fibres are linked (entangled) by very fine powerful jets of water, felting the product. During these treatments, the product is supported by belts and cylinders and is crossed by jets of water; finally, the product is dried and calendered if necessary. The most common application of the spunlace technology is in the preparation of absorbent materials for cleaning and/or sanitisation of surfaces (for example kitchen worktop cleaning cloths) and for wipes (personal hygiene, make-up . . . ). The present invention concerns a spunlace fabric based mattress cover sheet. The spunlace fabric used for the purposes of the invention has a weight/surface ratio of at least 20 $g/m^2$; preferably it is between 30 $g/m^2$ and 80 $g/m^2$, for example 50 $g/m^2$. The use of this weight/surface ratio range provides an excellent ratio between barrier effect and lightness/breathability of the fabric.

The fibres of the spunlace fabric used in the present invention are preferably chosen from polyester, viscose (artificial silk), polypropylene, polyamide, cotton or cellulose pulp fibres. It is possible to use one single type of fibre or fibres of different types combined. The viscose/polyester combination is preferred in particular: in it the viscose performs a mainly absorbent function, while the polyester increases the fabric strength; in these combinations, the viscose constitutes 50%–80% in weight, with the polyester constituting the remaining weight.

The dimensions of the fibres are generally between 0.9 and 3.3 dtex; the dtex, an indirect unit of measurement of the fibre section, indicates the weight in grams of 10,000 m of yarn.

In the sheet subject of the invention, the barrier effect can be further increased by applying one or more of the following techniques:

(i) production of a multilayer fabric, at least one layer of which consists of spunlace fabric;

(ii) addition of antibacterial substances incorporated in the fibre;

(iii) addition of antibacterial substances impregnated in the fabric.

Solution (i) provides for the formation of a multilayer structure. For example, a three-layer (sandwich) structure can be obtained in which the two outer layers are made of synthetic fibre, e.g. polyester, and the inner layer is made of an absorbent material, e.g. cellulose pulp. The adjacent layers can be joined by means of known systems including the spunlace process. It is therefore possible to entangle, as described above, a structure consisting of different overlapping layers of fibres, obtaining in this case a multilayer spunlace fabric. The outer layers can have a weight/surface ratio of 10–15 $g/m^2$ and the inner layer 20–40 $g/m^2$.

In solution (ii) the sheet contains antibacterial substances incorporated in the innermost structure of the fibre. The antibacterial substance is incorporated during the synthetic fibre extrusion phase, i.e. during the process of formation of the fibre itself. In general any antibacterial substances compatible with the process of incorporation and non-toxic to humans can be used; in the present invention the term "antibacterial" also comprises disinfectant, parasiticidal and insecticidal substances. Preferred antibacterial substances are: zeolite with silver, copper or zinc base, or organic additives such as Triclosan. These substances are characterised by a high effectiveness in preventing the formation of bacterial colonies and at the same time high compatibility and non-toxicity for humans.

In solution (iii) the sheet comprises antibacterial substances which are added to the fabric by means of an impregnation process.

The techniques described in points (i)–(iii) can be used alternatively or combined: for example, it is possible to produce a three-layer fabric impregnated with antibacterial substances, or the fibres of which contain the incorporated antibacterial substance.

The mattress cover sheet subject of the present invention is of the dimensions necessary to cover a mattress or a pair of mattresses (for example 1.5×2.5 meters or 2.5×3 meters) and is preferably provided with common means of attachment to the mattress, such as buckles, belts or hooks, or can be designed to wrap around and below the side edges of the mattress. The sheet can also be produced in a bag version, thus covering the entire mattress surface.

A further aim of the invention is a process for producing a mattress cover sheet characterised by the use of a spunlace fabric among the materials making up the sheet. The spunlace fabric can be in a ready-to-use form or can be produced extemporarily by entangling a layer of fibre, as described above. In the latter case, reference is made to the known processes for the formation of spunlace fabric such as those illustrated in the previous description of the known technique.

For production of the sheet according to one of the preferred solutions (i)–(iii) described above, the process will include respectively:

In case (i): the production of a multilayer fabric.

To produce the multilayer fabric, the layers of fibre are overlapped in the required order and directly subjected to the spunlace process, or it is possible to perform an initial calendering phase and then proceed with the spunlace process which completes the interconnection between the fibres. In any case, at the end of the process a coherent product is obtained in which the different layers are firmly interconnected. The pre-treatment by means of calendering is particularly effective in increasing the barrier effect.

In case (ii): the use of fibres containing antibacterial substances directly incorporated in the fibre.

The process of incorporation of additives in the synthetic fibres is known: it consists in adding the additive to the mixture which is fed into the extruder and which constitutes the fibre. This process produces a strong chemical-physical link between the molecules of the additive (in this case antibacterial additive) and polymer, obtaining effective fixing of the product which cannot be released to the environment.

In case (iii): the addition of antibacterial substances by means of impregnation of the fabric.

In this case the antibacterial substance is sprayed onto the fabric already formed, or during the phase immediately prior to the spunlace process or during the latter. For impregnation, a "foulard" application process is preferably used which permits uniform absorption of the product.

This process involves a first phase where the product is submerged in a solution contained in a tank and its physical structure is completely saturated with said solution. The second phase involves passage of the article between two opposed cylinders which have a squeezing effect; this operation regulates the amount of solution to be left on the product.

In all the cases described, the spunlace fabric, damp following the spunlace process and/or spraying with the antibacterial substances, undergoes a final drying process. Drying can be performed for example by tensioning the fabric on cylinders inside drying ovens: in this case a stretching effect is obtained which physically completes protection of the sheet in addition, obviously, to evaporating the water present in the product.

Finally, the fabric is cut to the mattress size and if necessary provided with the above-described fastenings.

The mattress cover described here provides an effective antibacterial/antiparasitical barrier: the effect is mainly of the mechanical type, obtained via the spunlace process and the optional phases of calendering, stretching and multi-stratification. This effect is supplemented by the chemical effect if the above antibacterial substances are used; in this case the two effects, mechanical and chemical, provide a combined action in achieving a total barrier.

The technology described here permits the production of said barrier with a modest use of material (weight of material per surface unit): this has the advantage of reducing the cost of the product and its overall dimensions and increasing ease of handling; at the same time the fine lightweight material does not substantially alter breathability and therefore does not create discomfort for the sleeper; lastly, the material is completely antiallergenic and non-irritating and if it contains antibacterial substances, they are incorporated in a stable fashion without the possibility of being released to the environment or towards the person.

The present invention is now illustrated via the following non-restrictive example.

Figure 2:
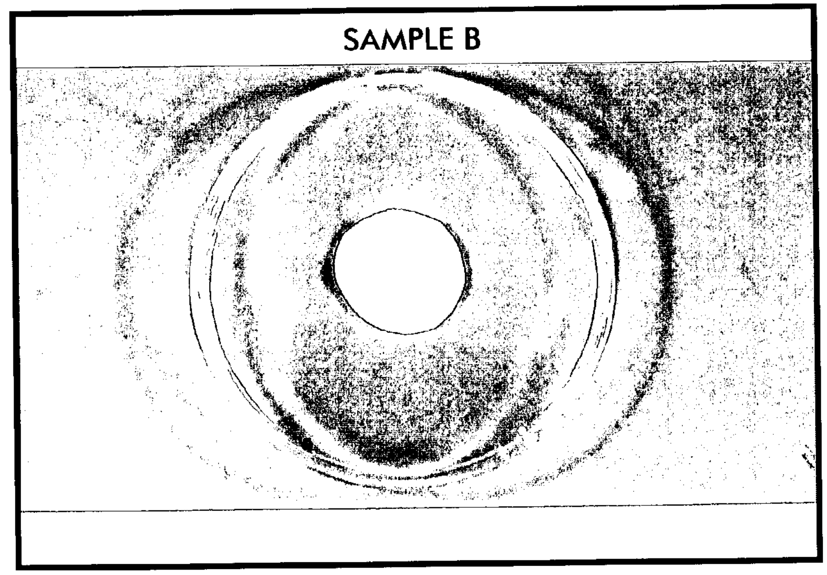
Figure 2:
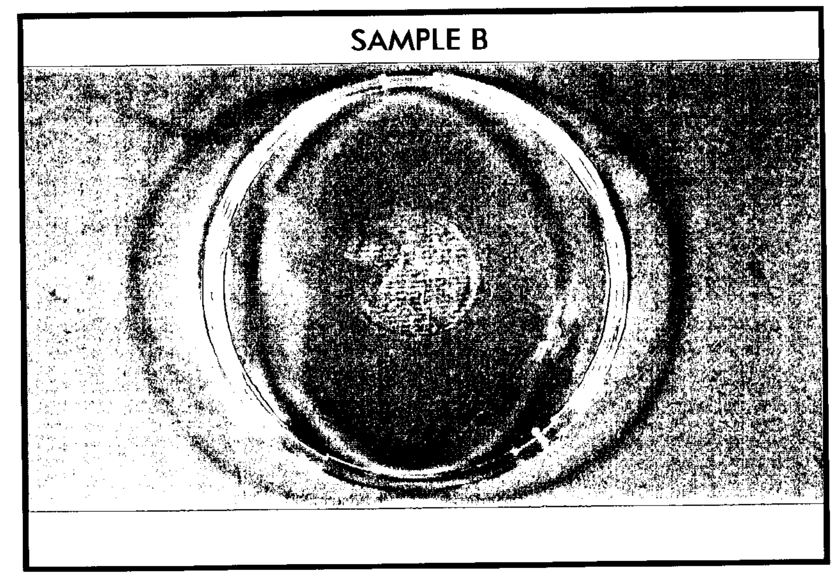
Figure 3:
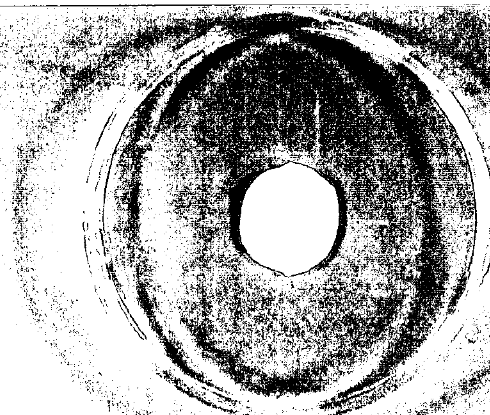
Figure 3:
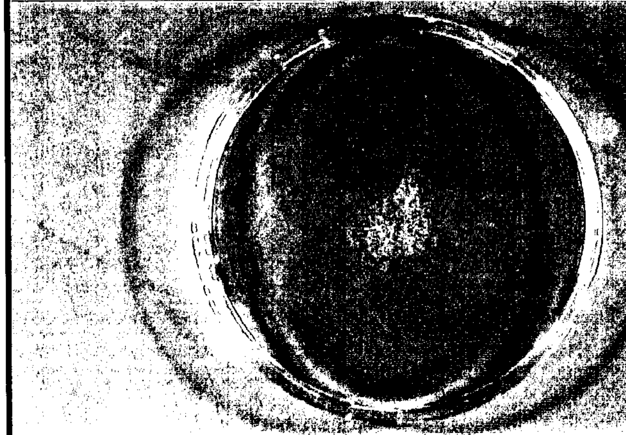

Experimental Part 3 samples of spunlace fabric were produced (A, B C) according to the present invention. The fabric samples were placed on a sterile agar culture medium and were inoculated, on their upper surface, with 0.1 ml of a solution of Staphylococcus aureus spores. After an incubation time of 18 hours at 37° C., the growth of bacterial colonies on the upper surface of the fabric (FIGS. 1*a*, 2*a* and 3*a*) was ascertained and, after removal of the sample, on the agar surface below (FIGS. 1*b*, 2*b*, 3*b*). It is observed that for all the samples tested A, B and C, no bacterial growth occurred either on the inoculated surface or on the agar below. This demonstrates that the sheet subject of the invention effectively resists bacterial penetration.

What is claimed is:

1. Mattress cover sheet comprising:

two outer layers of synthetic fibres having a weight/surface ratio of 10–15 g/m$^2$; and an inner layer of absorbent material having a weight/surface ratio of 20–40 g/m$^2$, said inner and outer layers being interconnected by a spunlace process.

2. Mattress cover sheet according to claim 1, in which said spunlace fabric has a weight/surface ratio of at least 20 g/m$^2$.

3. Mattress cover sheet according to claim 1, in which said spunlace fabric has a weight/surface ratio of between 30 g/m$^2$ and 80 g/m$^2$.

4. Mattress cover sheet according to claim 1, in which said fibres are polyester, viscose, polypropylene, polyamide, cotton or cellulose pulp fibres or mixtures thereof.

5. Mattress cover sheet according to claim 1, in which said fibres have dimensions of between 0.9 and 3.3 dtex.

6. Mattress cover sheet according to claim 1, in which the layers are further interconnected by means of a calendaring processes.

7. Mattress cover sheet according to claim 1, further comprising an antibacterial substance.

8. Mattress cover sheet according to claim 7, in which the antibacterial substance has been incorporated in said fibres during formation of the fibre itself.

9. Mattress cover sheet according to claim 1, further comprising mattress fastenings.

10. Process for producing a mattress cover sheet comprising: overlapping a first layer of synthetic fibres having a weight/surface ratio of 10–15 g/m$^2$, an inner layer of absorbent material having a weight/surface ratio of 20–40 g/m$^2$, and a second layer of synthetic fibres having a weight/surface ratio of 10–15 g/m$^2$; and subjecting said first, inner and second layers to spunlacing.

11. Process according to claim 10, comprising one or more of the following phases:

formation of a multilayer fabric;

use of fibres containing antibacterial substances directly incorporated in the fibre;

addition of antibacterial substances by means of impregnation of the fabric.

12. Process according to claim 10 in which the fabric is cut to size to cover and/or wrap completely or partly one or two mattresses, and provided if necessary with mattress fastenings.

13. Process according to claim 10, comprising subjecting said layers to calendering.

* * * * *